Figure 1:
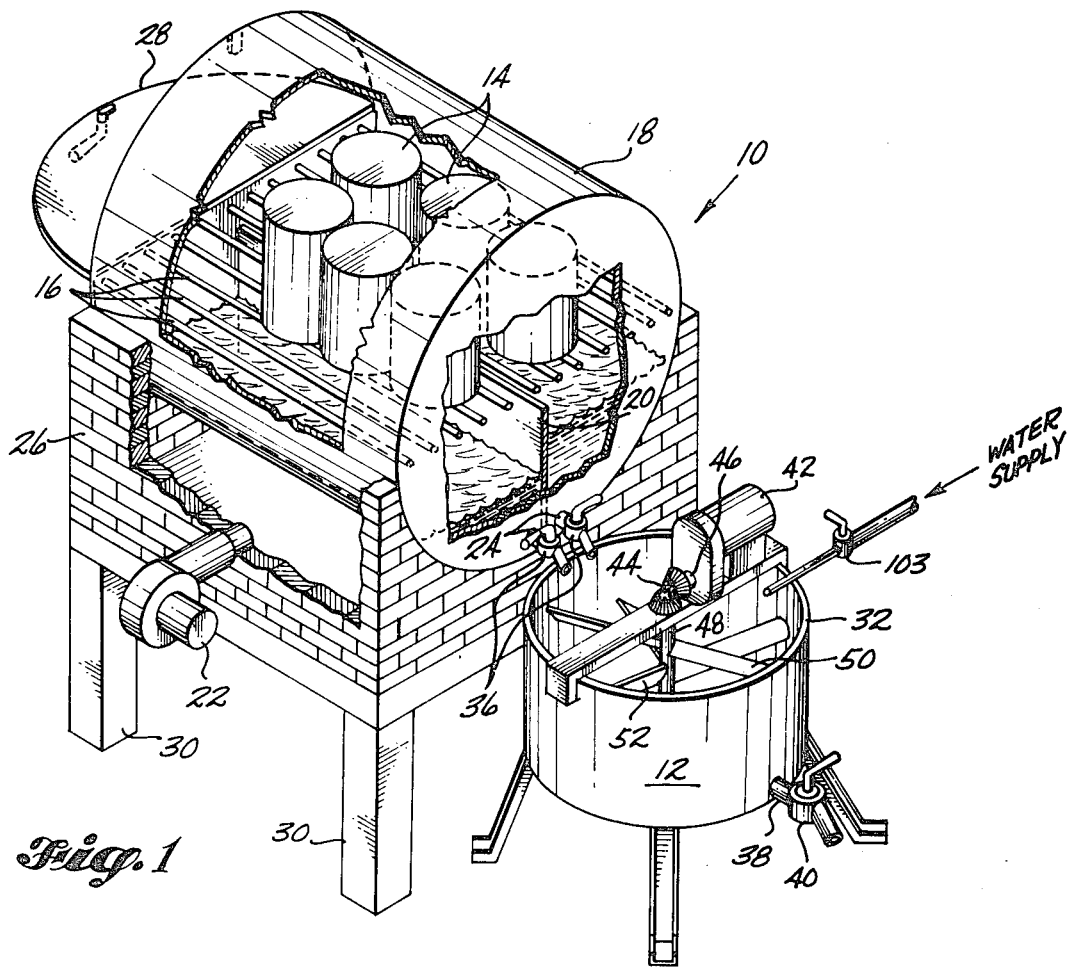

United States Patent [19]

DeBough

[11] 4,056,401
[45] Nov. 1, 1977

[54] ASPHALT EMULSION AND MANUFACTURE THEREOF

[76] Inventor: Bjorn N. DeBough, 8011 1st NE., Seattle, Wash. 98115

[21] Appl. No.: 580,366

[22] Filed: May 23, 1975

Related U.S. Application Data

[63] Continuation-in-part of Ser. No. 376,727, July 5, 1973, abandoned.

[51] Int. Cl.² ............................................. C08L 95/00
[52] U.S. Cl. ................................... 106/277; 106/278; 106/283; 252/311.5
[58] Field of Search ............... 106/277, 273, 170, 283, 106/278; 252/311.5

[56] References Cited

U.S. PATENT DOCUMENTS

| | | | |
|---|---|---|---|
| 1,398,201 | 11/1921 | Reeve | 252/311.5 |
| 1,690,020 | 10/1928 | Kirschbraun | 106/277 |
| 1,733,498 | 10/1929 | Kirschbraun | 106/277 |
| 1,734,437 | 11/1929 | Kirschbraun | 106/277 |
| 1,884,919 | 10/1932 | Thompson | 252/311.5 |
| 3,336,146 | 8/1967 | Henschel | 106/277 |

Primary Examiner—Lorenzo B. Hayes

[57] ABSTRACT

A method for preparing an asphalt emulsion having the smooth texture of whipped cream and which may be cold laid on wet wood and concrete surfaces to dry without blistering. Asphalt is heated to a temperature within the range from about 375° F. to about 400° F. and subsequently rapidly admixed with an aqueous slurry of hydrophilic clay in a manner and in proportions which achieve heat transfer from asphalt to clay slurry without excessive water evaporation to provide the desired emulsification.

2 Claims, 2 Drawing Figures

U.S. Patent        Nov. 1, 1977        4,056,401

ASPHALT EMULSION AND MANUFACTURE THEREOF

This application is a continuation-in-part of my copending application Ser. No. 376,727 filed July 5, 1973 now abandoned.

The present invention relates to asphalt emulsions and more particularly to a novel method for producing such an emulsion which may be cold laid and having superior characteristics.

Prior asphalt mixtures have been applied to wood sometimes using an intermediate layer of roofing paper or felt between the asphalt and the wood. Such asphalt mixtures are also however of the hot-laid type necessitating a time consuming, tedious, and often hazardous heating step prior to application. Some, e.g. as shown in U.S. Pat. No. 3,155,528 while cold laid on surfaces as a coating, contain expensive additives such as alcohol and dry into a film coating.

It is accordingly an object of the present invention to provide an asphalt emulsion which may be spread directly on wood or concrete surfaces without the use of an intermediate layer of material.

It is another object of this invention to provide an asphalt emulsion which may be cold laid and subsequently dries without blistering.

It is yet another object of the present invention to provide a cold-laid asphalt emulsion which may be applied to wet surfaces, e.g. wood or concrete and which is capable of expanding or contracting with heat or cold without cracking.

It is still another object of this invention to secure a cold-laid emulsion of a uniform stable composition by a method of mixing an asphalt and aqueous slurry under conditions whereby effective heat transfer occurs between the heated asphalt and the water volume of the slurry so that emulsification is thereby induced and promoted with a minimum of water evaporation and consequent heat loss.

It is a further object of this invention to provide a method and apparatus for mixing slurry and asphalt in a manner to achieve emulsification with reduced evaporation while subsequently enabling a further mixing mode prior to cooling for restoration of water lost by evaporation.

It is yet a further object of this invention to provide methods for emulsifying asphalts having different penetration values utilizing clay slurry of various hydrophilic clays wherein heat transfer over to steam is managed and controlled in a manner to result in the desired emulsification.

Figure 2:
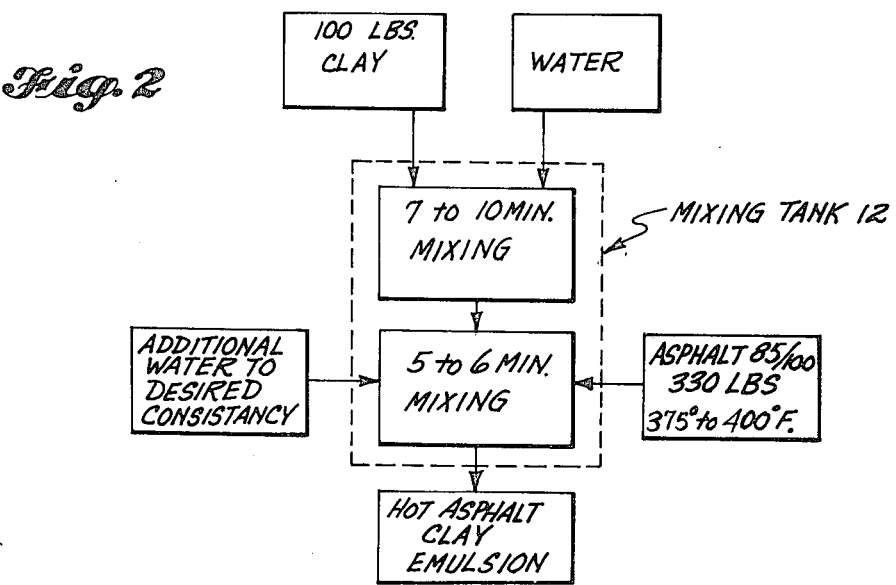

Further objects and advantages of the present invention will become more apparent from the following specification when taken in connection with the drawing wherein:

FIG. 1 is a perspective view of an apparatus of the type successfully used in the preparation of small amounts of the present emulsion; and FIG. 2 is a flow chart illustrative of method steps utilized in the preparation of an asphalt emulsion subsequently discussed in detailed by way of specific example.

In FIG. 1, a furnace 10 is shown for heating asphalt which is added to mixing tank 12 to an aqueous slurry of hydrophillic clay to provide as asphalt emulsion. The present asphalt heating furnace 10 is of a design especially suitable to the present process wherein steel drums 14 containing asphalt may be moved from a platform (not shown) directly onto a support grid at the same level comprising a plurality of parallel rods 16 positioned in a plane extending from and including the platform. The plane of the support grid comprising steel rods 16 is disposed parallel to the ground surface supporting furnace 10 and divides cylindrical housing 18 into a top chamber housing the drums 14 and a bottom chamber containing two batches of asphalt being heated in the furnace 10. Baffle plate 20 is arranged in a vertical plane and separates the bottom chamber to provide for simultaneous heating of two batches of asphalt and/or subsequent heating of a further batch while the other is being further utilized in the process. An oil burner 22 provides heating of the outside surface of cylindrical housing 18 below the bottom chamber and consequent heating of the two batches of asphalt separated by baffle plate 20. Two discharge pipes 24, one for each batch are provided with a valve 36 for metering molten asphalt into mixing tank 12. A brick wall 26 is herein shown extending around the bottom half of cylindrical housing 18 below the support grid comprising rods 16 and also supporting and cradling housing 18. Besides support, brick wallwork 26 also serves to retain heat from oil burner 22 within the volume formed between the wall and the bottom semi-cylindrical surface of housing 18 below the grid for increased heating efficiencies and insulation. Semi-circular door 28 provides the closure means for opening and closing the semi-cylindrical top chamber portion of cylindrical housing 18 for insertion of additional drums 14 containing asphalt to be heated and withdrawl of these empty drums subsequent to the dumping of the contents through the grid comprising rods 16. While four legs (two shown) 30 are utilized to support wall 26, the wall 26 could extend up from ground level not necessitating these legs 30. However, the supporting means (here the wall 26 and legs 30) is required to raise the bottom level of cylindrical housing 18 above the top edge of the wall 32 of mixing tank 12 so that the molten asphalt can be introduced at the proper time in the manner hereinafter described into the slurry previously prepared in mixing tank 12.

Open top mixing tank 12 having a discharge pipe 38 provided with a valve 40 is provided with a variable speed motor 42 having a drive shaft 46 coupled through bevel gear means 44 to the top of mixing blade support shaft 48 supported for free rotation at the bottom of tank 12 and extending upward along the central axis of cylindrical wall 32. Mixing blades 50 and 52 extending from support shaft 48 are tilted so that the planes containing the blades are disposed at 45 and 135 degree angle relationships with respect to the central axis of cylindrical wall 32 so as to impart the desired mixing motion to the contents of mixing tank 12. The present mixing tank configuration successfully utilized in practicing the present process had a diameter of 5 feet and the motor 42 provided a slow speed of rotation of the mixing blades about mixing blade support shaft 48 during slurry preparation and increased to 50 to 90 r.p.m. during the asphalt addition and emulsification phase of the process.

While this mixing tank configuration provided the desired control in the emulsification process in the present batch method, it will be regarded and recognized by those skilled in the art that the principles of operation and relationships illustrated by the present configuration may be utilized and applied on an expanded scale where single batch processing of larger amounts is desired as for example where it is desired to manufacture the present asphalt emulsion product off site at a factory for storage and later distribution, sale, and application in small amounts.

In the following discussion of examples of successful mixtures prepared, some theory will be advanced which is believed to explain the success of the present process in providing the superior emulsion and provide a better understanding of the present method as contrasted to the methods used in the preparation of emulsions, e.g. as shown in U.S. Pat. Nos. 1,822,834 and 3,336,146 where a preheating of slurry prior to mixture with asphalt is effected. In this connection, it should also be appreciated that even many efforts prior to 1930 were made in an effort to try to achieve satisfactory emulsification as evidenced in a number of patents which are mentioned as prior art in the introductory part of U.S. Pat. No. 3,155,528 hereinbefore mentioned and which include U.S. Pat. Nos. 1,479,042; 1,302,810; 1,398,201; 1,495,260; 1,506,371; and, 1,734,437 which should be read for an understanding of the variety of these efforts.

Prior to a description of detailed examples of the present process description, it would appear desirable to make mention of the materials which can be used in the present process. First, it should be mentioned that the present asphaltic emulsions are clay based aqueous emulsions which utilize a hydrophillic clay therein.

Asphalt is a dark brown to black cementitious material, solid or semi solid in consistency in which the predominating constituents are bitumens which occur in nature as such or are obtained as residua in petroleum refining (ASTM), the latter being used in the present emulsion preparation. It is a mixture of parafinic and aromatic hydrocarbons and heterocyclic compounds containing sulfur, nitrogen, and oxygen. Asphalt properties are black solid or viscous liquid; sp. gr. about 1.0; Flash point about 450° F.; autoignition temp. about 900° F.; solid softens to viscous liquid at about 200° F.; has rheological properties of a Newtonian liquid; and vary in penetration value paving (40–300), and roofing (values of 10–40).

As mentioned petroleum based asphalts were used in the examples hereinafter given and always utilized in their viscous liquid state, thus by definition above about 200° F., the specific temperatures given hereinafter.

Penetration value which at least up until recently has been the the most universally recognized and most widely known manner of classification of asphalts, is a measure of the consistency or relative hardness of the asphaltic material, having a complete definition of how the test classification is carried out at page 13-2 of Petroleum Products Handbook, First Ed. 1960 McGraw Hill Inc. New York.

In the practice of the present invention, asphalts from the hardest (roofing) to softest (paving) which could readily be obtained were emulsified satisfactorily by the present process without failure, which specific types included a hard (roofing) asphalt having a penetration value in the range 10 to 40, i.e. about 32 identified as 165, a petroleum asphalt by Chevron Oil Company of Richmond Beach, Washington; an intermediate hardness asphalt in the range 85 to 100 penetration; and a soft (paving) asphalt having a penetration value in the range 120 to 150 identified as AR 2000 by the aforementioned Chevron Oil Company; and a very soft asphalt having a penetration value of around 200 identified as AR 1000 and also obtainable from the aforementioned Chevron Oil Company at Richmond Beach, Washington.

The hydrophilic clays which are employed in preparing the aqueous emulsion, in combination with the petroleum asphalt, may comprise the naturally occuring chemically unmodified clays. The term hydrophilic in physical chemistry is a term which denotes that the material (here clay) has a strong affinity for water which hydrophilic clays successfully utilized and hereinafter given by way of examples have to varying degrees, e.g. kaolin absorbs very little water compared to bentonite at the other extreme, while ball clay and fire clay are intermediate in their ability to absorb water. These hydrophilic clays comprise crystalline complex silicates, the exact composition not being subject to precise description, since they vary widely from one natural source to another. These clays may be described as complex in organic silicates.

Hydrophilic clays which were utilized in the hereinafter described novel asphaltic emulsion compositions are now discussed, it being of special note here that it is important only that a hydrophilic clay be selected which is capable of absorbing from less than about ten times its weight of water to about its own weight of water. Hydrophilic clays, giving their general make up, and more importantly their ability to absorb water discussed hereinafter in connection with the specifics of the process included: ball clay which is a fine textured and highly plastic detrital clay which, on firing, yields pale coloured or white pottery available in most clay stores but also available as OM4, Old Mine Co. Kentucky, absorbing about 1 to 1½ its weight in water; fire clay, a clay capable of being subjected to high heat without fusing and hence used for firebrick, crucibles, etc. It contains much silica and only small amounts of lime, iron or alkalies; the two preceding clays are obtainable from Spencer Pottery Inc., Seattle, Wash. The fire clay also absorbing about 1 to ½ its weight in water, actually the ball clay is slightly more hydrophilic than the fire clay; Dutch clay is a complex hydrosilicate a little more hydrophilic than the preceding in that it can absorb about three times its weight in water which clay has a slight reddish hue; Volclay trade name of American Colloid Co., Chicago, Illinois) which is a bentonite clay capable of absorbing a great amount of water viz. up to about 10 times its weight of water.

When 100 pounds of a hydrophillic clay capable of absorbing about three times its weight in water which clay has been dehydrated and pulverized is placed in mixing tank 12 and water is added by opening valve 103 causing water to flow from the water supply into mixing tank 12 while simultaneously adjusting the speed of varidrive motor 42 to cause mixing blades including blades 50 and 52 to rotate at a speed of less than 50 revolutions per minute so as to satisfactorily slowly and without blowing out mix in the clay powder, valve 103 is controlled to add enough water so that the hydrophilic affinity of the clay for water is fully satisfied resulting in a clay-water slurry having the liquid appearance of heavy cream. Therefore excellent results are obtained when about 300 pounds of water have been added. In less than about ten minutes mixing time a slurry having the aforementioned characteristics are obtained. Note here that the slurry has not been preheated as in certain of the prior art processes hereinbefore mentioned. Furnace 10 contains asphalt viz. one of the commonest intermediate asphalts available, the aforementioned and identified petroleum asphalt having penetration value falling in the range 85 to 100 which is heated in the range 375° F. to 400° F. which is added (e.g. 330 pounds) rapidly (e.g. at a rate of 8 to 10 gallons per minute) by the opening of either of valves 26 to mixing tank 12 whereby a heat transfer from asphalt to clay water slurry is achieved without excess water evaporation. The water in the clay slurry is thus heated and believed to go over to steam and thus through diffusion and polytropic process starts to polymerize (entropy of liquids). As air is trapped in the mixture, emulsification and particle suspension occurs. After emulsification has taken place, the water lost through evaporation is added before cooling (lwhile the emulsion is at an elevated temperature). During the asphalt mixing and emulsification step and during this period of water addition to achieve the desired consistency of whipped cream the mixing speed is raised from the earlier value in the range below 50 r.p.m. utilized for mixing the clay slurry to a speed in the range 50 to 90 r.p.m. If too much evaporation of water was permitted to occur during the asphalt-slurry mixing and consequent emulsification step, the end result might be an adhesive by perhaps osmosis type occurrence. However this would happen only through human error in temperature control, mixing rate or mixture composition error and not where these steps are performed under automatic control, e.g. as by analog computer and viscosity sensing for monitoring emusification occurrence and controlling asphalt flow and mixing speeds. Water and asphalt should not be added at the same time but as in the step by step process outlined above. This might only be done by an operator where the heat of evaporation was accidently in excess and dried out the clay slurry so that the polymerization stopped however this attempted corrective step might not be sufficient to prevent a batch result as an adhesive. The balance of heat released from asphalt and mixing speed rates as described in the process is to avoid evaporation, but if steam is released in an excess, the adding of asphalt should stop, and water should be added until the stringing of asphalt ceases. Typically, the mixing of asphalt and clay slurry and subsequent addition of water before cooling continues for a time period of 5 to 6 minutes. A water repellant e.g. Scotch Gard, a oil and water stain repellant of 3M company may be sprayed over a dried emulsion coated surface to prevent water penetration and provide a seal for water repellancy, the aforementioned oil and water repellant based on a fluorine derivative and readily available on the market being often used in connection with textile treatment.

Typical mixtures illustrative of satisfactory ratios used in the above method to produce the present cold-laid asphalt emulsion which may be stored in sealed steel drums and used months later with perhaps only the addition of some water included:
  40 pounds clay + 120 pounds water mixed to form the clay slurry to which were added in the present process, 320 pounds of asphalt to produce 480 pounds of emulsion; and
  80 pounds clay + 160 pounds water to form the clay slurry to which was added in the present process 480 pounds asphalt to produce 720 pounds of the desired emulsion.

As can be seen from the above slurry make up, a clay having a hydrophilic nature such that it takes on or absorbs three times its weight in water is selected form the aforementioned hydrophilic clays hereinbefore specified by way of example. Other hydrophilic clays e.g. the ball clay hereinbefore mentioned may be used, but with ball clay, the water to be added which can be absorbed by it is less viz. only one and one half its weight of water which would be added in the above example while still maintaining the ratio of twice as much by weight of asphalt to clay slurry. The above example utilized a medium hardness asphalt viz. asphalt in the 85 to 100 range heated to a temperature within the range from about 375° F. to about 400° F. Very soft asphalts up to penetration values around 200 hereinbefore mentioned have been emulsified by the above method into a stable lather while still utilizing the same heated asphalt temperature range and ratio of asphalt to slurry weight. It can be noted from the preceding that since the clay slurry is unheated, being at an ambient temperature of from 32° F. to 110° F., and since the range temperature wise of the heated asphalt can be as low as about 375° F., then and therefore the asphalt is as a consequence heated to a temperature greater than about 343° F. higher than the temperature of the aqueous slurry, viz. one way of defining the difference in temperature and heat transfer going on to successfully emulsify paving asphalts by definition hereinbefore given as those having penetration values in the range 40 to 300 pen. While in fact a hard asphalt (that identified earlier as 165 having a penetration value of about 32 was done with the same considerations of slurry make up as outlined earlier and weight of slurry to asphalt, such hard asphalt required a temperature around about 525° F. and did not lather to increase its volume with the appearance of whip cream, such experiment did prove the capability of concepts of the process to successfully emulsify a very hard asphalt into an emulsion which could be cold laid. Successful emulsification of a hard asphalt which can be cold laid is believed to be somewhat surprising in itself.

The subsequent further description is as far as understood believed to be of keynote importance to an understanding of the phenomenon of success in emulsification taking place in accordance with the examples of the process. In the previous description, the aforementioned emulsion in the case of paving asphalts (penetration values 40–300) was described as having the smooth texture of whipped cream. The aforementioned product emulsion has an entrapped air volume of less than about 30 percent e.g. 18 percent the exact amount of which is difficult to determine since occuring during the emulsification when the heated asphalt is being added and together with the slurry in the tank is rapidly expanding and may therefore be termed a lather. The state of the art clay asphalt emulsions observed since latherless, are not easy to spread out, and when they do dry out upon application thereof to the work surface, become brittle and tend to crack. Some are utilizing various solvents to aid in spreading which dry out, the surface drying hard sooner than the underlying portion of the coating leading to an increased tendency to crack. While the exact mechanism of how the lather nature of the emulsion is achieved or what happens during subsequent drying is not clearly understood and was merely hereinbefore alluded to, it is clearly known from the preceding how it can be manufactured, and its superior charactersitics have been noted. It has been found that the average diameter of the clay particles should not exceed about 0.002 inches to effect the lather even though some may be larger or smaller. With such particle size and rapid admixing of the paving asphalt heated within the range of 375° F. to 400° F., the water surrounding the small clay particles vaporizes and goes over to steam on heating by the asphalt so that a multitude of small gas cells are formed throughout the emulsion. When the steam condenses to water upon cooling, these cells remain, and later upon application of the emulsion to the work surface and subsequent drying the entrapped moisture is apparently able to travel out to and through the thin asphalt walls of these cells to the surface of least pressure viz. atmospheric leaving a more pliable product than the relatively solid brittle product of the prior art. This is important in many applications as the floor on which the present product was tested and wherein heavy loads were moved over the surface which remained as a result of the above described phenomena pliable enough to give rather than crack and yet provide adequate strength. A one half inch layer appears adequate for roof applications and while such a layer is not a vapor barrier, there is apparently a sufficient moisture barrier which ideally permits vapor from within or at the roof surface to pass out and still moisture such as rain water from above is prevented from flowing through the product coating to the underlying roof structure. The present product emulsion is cold laid and spread out as whipped cream over a cake as by a brush or broom unlike some other known asphalt emulsions which painted onto the work surface, the product emulsion having a longer drying time. The product paving asphalt emulsion lather when stored in sealed air tight drums surprisingly does not slump or collapse during storage and water may be mixed in prior to application to alter consistency as desired. Rapid stirring in at mixing speeds of 50 to 90 r.p.m. of the heated asphalt into the clay particled slurry and resultant surprising increase in volume in the case of paving asphalts into stable form when emulsified, and the addition of water before cooling during the method of manufacture to restore certain moisture lost during the process contribute among other factors and considerations hereinbefore mentioned to the quality of the product emulsion. Again for the purposes of this disclosure, a hydrophilic clay is a clay e.g. ball clay, fire clay, bentonite etc. as defined herein which is cabable of absorbing at least its own weight in water, and therefore pure kaolin is not considered hydrophilic since not absorbing this much water as required too produce sufficient steam for emulsification. Mixtures of various clays proved satisfactory as long as there are hydrophilic clay particles as defined which as a consequence in the process can start the emulsification process.

I claim:

1. A method for preparing an asphaltic emulsion consisting of clay, asphalt and water which comprises: preparing a slurry, at ambient temperature, consisting of water of a hydrophilic clay having a particle size not exceeding about 0.002 inches and capable of absorbing from up to about ten times its weight of water to about its own weight of water; preheating an asphalt having a range of 40 to 300 penetration to a temperature within the range from about 375° F. to about 400° F.; and, admixing said slurry with said asphalt while agitating at a mixing speed of between 50 and 90 r.p.m. to emulsify the slurry and asphalt into a lather having an increase in volume of about 18 percent.

2. A product produced by the method of claim 1 for coating a surface characterized by said product providing water runoff across the surface thereof subsequent to coating of the surface while permitting vapor passage from the surface through the coating.

* * * * *